3,027,312
IRRADIATION OF TUBULAR MATERIALS
William C. Lanning, Bartlesville, Okla., assignor to Phillips Petroleum Company, a corporation of Delaware
Filed May 29, 1958, Ser. No. 738,660
3 Claims. (Cl. 204—154)

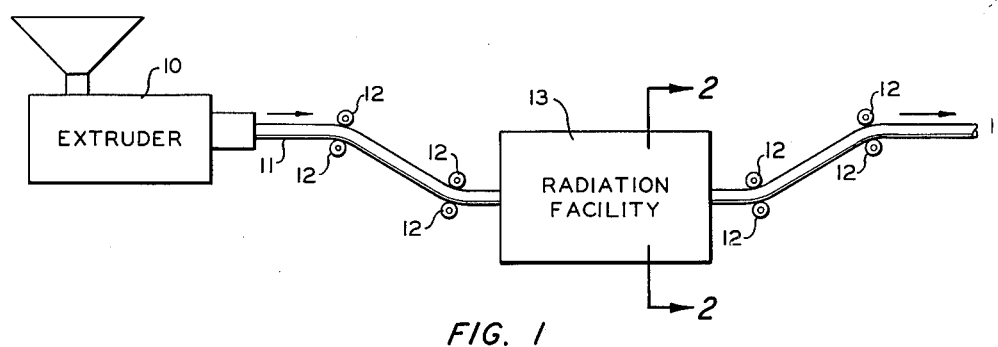
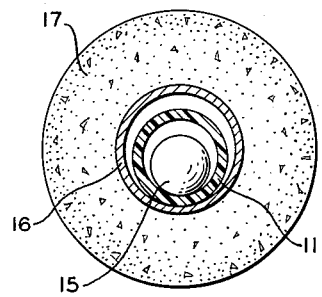
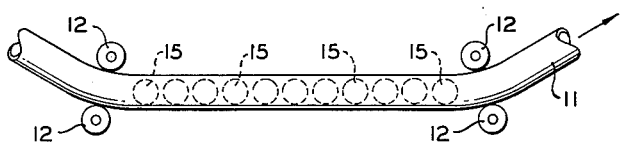
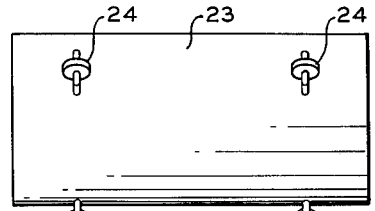
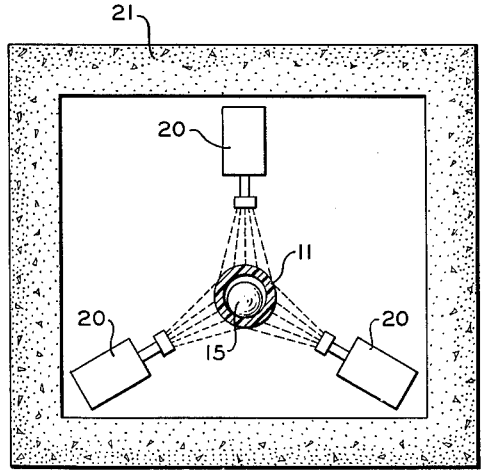
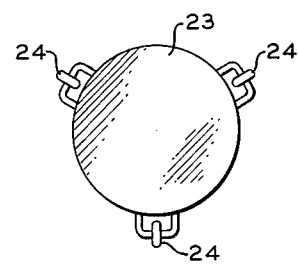

This invention relates to a method of and apparatus for irradiating tubular materials.

It is known that the properties of various materials can be modified by subjecting the materials to ionizing radiation. For example, several of the physical properties of polyethylene, such as thermal resistance and resistance to environmental stress cracking, are improved by subjecting the polyethylene to radiation. However, it has been difficult to irradiate hollow materials, such as tubing, uniformly. This is particularly true when beta rays are employed due to the relative poor penetration of this type of radiation.

In accordance with the present invention there is provided an improved procedure for irradiating hollow materials, such as tubing, in a continuous manner by subjecting the tubing to irradiation from both external and internal sources. This irradiation can advantageously be performed immediately after the tubing is extruded. The internal irradiation is accomplished by disposing one or more members constructed of radioactive material within the tubing. The external radiation is accomplished by positioning any convenient source of radiation adjacent the outer wall of the tubing. The tubing is moved downwardly toward and upwardly away from the section containing the radioactive members so that the members are retained at a given location by the force of gravity. It is generally desirable to enclose both of the radiation sources in a suitable radiation shield.

Accordingly, it is an object of this invention to provide a method of irradiating tubing continuously by subjecting the tubing to radiation from internal and external sources.

Another object is to provide a method of irradiating the inner surface of tubular materials.

A further object is to provide apparatus for irradiating tubular materials immediately following extrusion of the materials.

Other objects, advantages and features of this inventions should become apparent from the following detailed description which is taken in conjunction with the accompanying drawing in which:

FIGURE 1 is a schematic representation of apparatus employed to carry out the method of this invention.

FIGURE 2 is a view, shown partially in section, taken along line 2—2 in FIGURE 1.

FIGURE 3 is a view showing a first embodiment of the internal radiation source.

FIGURE 4 is a view showing a second embodiment of the external radiation source.

FIGURE 5 is a view of a second embodiment of an internal radiation source.

FIGURE 6 is an end view of the radiation source of FIGURE 5.

Referring now to the drawing in detail and to FIGURES 1, 2 and 3 in particular, there is shown a conventional extruder 10 which continuously forms a tubing 11 from polyethylene or other plastic materials known in the art. Tubing 11 is directed by a plurality of guide wheels 12 in a downward path toward the inlet of radiation facility 13. The tubing leaving facility 13 moves upwardly past additional guide wheels 12 so that the section of the tubing inside facility 13 is lower than the sections of the tubing outside the facility. As illustrated in FIGURES 2 and 3, a plurality of balls 15 are disposed within tubing 11 inside radiation facility 13. These balls are of smaller diameter than the tubing so that they are free to roll inside the tubing as it is moved through the radiation facility. Balls 15 are retained in this location by the force of gravity. As described hereinafter in detail, these balls 15 are formed of a suitable radioactive material so that the inner wall of tubing 11 is subjected to ionizing radiation when the tubing is moved past the balls.

As illustrated in FIGURE 2, tubing 11 passes through a hollow cylinder 16 within radiation facility 13. Cylinder 16 is also formed of a suitable radioactive material so that the external wall of tubing 11 is subjected to ionizing radiation as the tubing moves through the radiation facility. Cylinder 16 is surrounded by a radiation shield 17 which can be formed of lead, a high density concrete, or other suitable material to prevent the escape of radiation.

Balls 15 and cylinder 16 are formed of or contain a suitable radioactive material which provides the desired radiation dosage. If it is desired to subject the tube to beta rays, balls 15 and cylinder 16 can be formed of the oxide of strontium$_{90}$. This material has a half life of 28 years and emits beta rays having energies of approximately 2.27 mev. If it is desired to subject the tube to gamma ratiation, the balls or cylinder can be formed of cobalt$_{60}$, for example. In order to conserve radioactive material, the balls can be formed of a material such as aluminum which has an outer coating of the radioactive material. This coating can be applied to the balls by means of a suitable binder such as a ceramic cement. The amount of radioactive material on the balls, the number of balls, and the speed at which the tubing is moved through the radiation facility depend upon the desired degree of radiation to which the pipe is to be subjected. This varies with different types of material and with the thickness of the tubing wall.

As a specific example of this invention, aluminum balls somewhat less than two inches in diameter are coated with strontium oxide of a thickness of 1.6 mm. The oxide contains about fifty percent Sr$_{90}$O and is secured to the aluminum balls by a ceramic binder. Polyethylene pipe of two inch inside diameter is extruded at a rate of one foot per minute. A suitable number of balls is provided to fill some 10 to 15 feet of the pipe. Data have shown that radiation dosages of $10^6$ to $10^8$ reps. greatly improve the resistance of the pipe to stress cracking.

In addition to polyethylene, various other materials can be modified advantageously by ionizing radiation. Examples of materials which become cross-linked include polystyrene, nylon, polyesters, natural rubber, neoprene, GRS rubber, butadiene-acrylonitrile copolymers, and the like.

In FIGURE 4 there is shown a second embodiment of the radiation facility wherein the outer wall of tubing 11 is subjected to radiation from a plurality of radiation generators 20. These generators can be suitable high speed particle generators, or they can represent high energy X-ray machines. Suitable radiation sources for use in this manner are described in Bulletin 4150, Applied Radiation Corp., Walnut Creek, California, January 1957. Generators 20 are also surrounded by a radiation shield 21.

In FIGURES 5 and 6 there is shown a second embodiment of a radioactive member which can be employed to irradiate the inner wall of tubing 11. This member comprises a cylinder 23 which has spaced wheels 24 mounted on the ends thereof. The wheels readily permit tubing 11 to move past cylinder 23 when the cylinder is positioned within the tubing. This configuration has certain advantages in that a larger surface of radioactive material is positioned immediately adjacent to the inner wall of the tubing to be irradiated. Cylinder 23 is formed of suitable radioactive materials to provide the desired degree of radiation.

While the invention has been described in conjunction with present preferred embodiments, it should be evident that it is not limited thereto.

What is claimed is:

1. The method of irradiating tubing which comprises positioning a member which is formed at least in part of radioactive material within the tubing to be irradiated, said member being smaller than the inside of said tubing so as to be positioned loosely therein, positioning a source of radiation externally of and adjacent said tubing so that the outer wall of said tubing is subjected to radiation, and moving said tubing longitudinally of said member and said source so that said tubing extends upwardly on both ends of said member, whereby said member is retained at a low region in said tube by the force of gravity and both the inner and outer walls of said tubing are irradiated.

2. The method of irradiating tubing which comprises positioning a member which is formed at least in part of radioactive material within a section of the tubing to be irradiated, said member being smaller than the inside of said tubing so as to be positioned loosely therein, and moving said tubing longitudinally of said member so that said tubing extends upwardly on both ends of said member, whereby said member is retained in a low section of said tubing by the force of gravity.

3. Apparatus for forming irradiated tubing comprising an extruder, a source of radiation spaced from said extruder, a member formed at least in part of radioactive material, first guide means positioned between said extruder and said source of radiation to direct tubing formed by said extruder downwardly and toward said source so that said tubing encloses said member, and second guide means positioned on the side of said source away from said extruder to direct the tubing upwardly and away from said source so that said member remains within said tubing at a low region thereof by the force of gravity.

References Cited in the file of this patent

UNITED STATES PATENTS 2,724,059    Gale    Nov. 15, 1955
2,763,609    Lewis et al.    Sept. 18, 1956

OTHER REFERENCES

Manowitz: "Nucleonics," March 1953, pp. 18–20.